(12) United States Patent
Lee et al.

(10) Patent No.: US 9,671,574 B2
(45) Date of Patent: Jun. 6, 2017

(54) OPTICAL INTEGRATED CIRCUIT COMPRISING LIGHT PATH TURNING MICRO-MIRROR INSIDE THE OPTICAL WAVEGUIDE AND METHOD OF MANUFACTURING THE SAME

(71) Applicants: Wooriro Co., Ltd., Gwangju (KR); Young Hye Kim, Daejeon (KR)

(72) Inventors: Sang Hwan Lee, Daejeon (KR); Chan Yong Park, Gwangju (KR); Young Hye Kim, Daejeon (KR)

(73) Assignee: Wooriro Co., Ltd., Gwangju (KR)

( * ) Notice: Subject to any disclaimer, the term of this patent is extended or adjusted under 35 U.S.C. 154(b) by 0 days.

(21) Appl. No.: 15/019,975

(22) Filed: Feb. 10, 2016

(65) Prior Publication Data

US 2016/0238801 A1   Aug. 18, 2016

(30) Foreign Application Priority Data

Feb. 13, 2015   (KR) ........................ 10-2015-0022625

(51) Int. Cl.
| | |
|---|---|
| G02B 6/42 | (2006.01) |
| G02B 6/43 | (2006.01) |
| G02B 6/136 | (2006.01) |
| G02B 6/125 | (2006.01) |

(52) U.S. Cl.
CPC .......... *G02B 6/4214* (2013.01); *G02B 6/125* (2013.01); *G02B 6/136* (2013.01); *G02B 6/43* (2013.01)

(58) Field of Classification Search
CPC .................................................... G02B 6/4214
See application file for complete search history.

(56) References Cited

U.S. PATENT DOCUMENTS

| | | | |
|---|---|---|---|
| 8,542,963 B2 * | 9/2013 | Nakagawa ........... | G02B 6/4214 385/14 |
| 2004/0240783 A1 * | 12/2004 | Junnarkar ............... | G02B 6/42 385/31 |
| 2013/0051729 A1 * | 2/2013 | Chen ...................... | G02B 6/30 385/32 |

* cited by examiner

*Primary Examiner* — Omar R Rojas

(57) ABSTRACT

An optical integrated circuit comprises optical waveguides, grooves formed by etching the upper cladding layer, the core layer and all or parts of the lower cladding layer close to a end section of the optical waveguide to intercept light transmitted through the core layer of the optical waveguide or to couple light into the core layer, a plurality of bonding pads formed around the groove, micro-mirrors and active optical elements. Such a PLC based optical integrated circuit and a method of manufacturing the same provides a low-cost manufacturing of optical integrated circuits and high quality mirrors for vertical optical coupling scheme.

16 Claims, 9 Drawing Sheets

OPTICAL INTEGRATED CIRCUIT COMPRISING LIGHT PATH TURNING MICRO-MIRROR INSIDE THE OPTICAL WAVEGUIDE AND METHOD OF MANUFACTURING THE SAME

RELATED APPLICATION

This application claims the benefit of priority of Korean Patent Application No. 10-2015-0022625 filed Feb. 13, 2015, the contents of which are incorporated herein by reference in their entirety.

FIELD AND BACKGROUND OF THE INVENTION

1. Field of the Invention

The present invention relates to an optical integrated circuit and a method of manufacturing the same. More particularly it relates to a PLC based optical integrated circuit including a light path turning micro-mirror inside the optical waveguide and a method of the same.

2. Description of the Related Art

The transmission capacity of optical communication system and optical interconnection apparatus has been continuously increased to meet the rising demand of wired/wireless communication traffic. A transmission distance of an optical cable decreases as data rate increases same as a copper cable. Accordingly new transmission technologies such as a multi lane transmission techniques and a higher order modulation technique in combination with a coherent detection technique has been developed.

Among the above technologies, the multi lane transmission technique is divided into two groups; (1) increasing the number of physical transmission paths and, (2) a wavelength division multiplexing (WDM) technology which transmits optical signal having a plurality of different wavelengths through a single optical fiber.

A transmission method using a multiple optical fiber is economical when the transmission distance is very short, for example, equal to or less than several hundred meters. However, when the transmission distance is longer than that the WDM technique is more economical.

A typical WDM system includes optical transmitters and optical receivers which convert electrical signal to light signal and light signal to electrical signal, respectively. Optical transmitters include a plurality of light sources each of them generating a different wavelength of lights and a multiplexer (MUX) which combines the lights having different wavelengths and sends its output to optical fibers. Optical receivers include a demultiplexer (DMUX) which spatially separates the muxed light signal into multiple light channels depending on the pre-determined wavelengths and a plurality of photodetectors receiving the light signals from each separated light channels and converting the light signal to electrical signal.

An arrayed waveguide grating (AWG) is one of the most popular MUX and DMUX device with a MUX/DMUX based on thin film filter technology. An AWG is also one of a key component consisting a planar lightwave circuit (PLC). AWGs can be made with a variety of materials including polymer, silicon oxide (SiOx), or silica on silicon or glass substrate. Among them, silica on silicon or glass has been the most widely used for the manufacturing of AWGs because it has lowest insertion loss. Wherein, the PLC means a lightwave circuit having optical waveguides for active or passive components in which a propagation path of a lightwave signal is substantially parallel to the surface of the lightwave circuit. The PLC is an essential element of a hybrid and monolithic optical integrated circuits.

In optical telecommunication systems, laser diodes and photodetectors are the most representative electrical-optical (E-O) and optical-electrical (O-E) conversion devices, respectively. Among photodetectors, surface illuminated type photodetectors which have a light detection active region on the surface is more common than alternative waveguide type photodetectors.

A vertical cavity surface emitting laser (VCSEL) is a surface emitting type light source emitting light from the front surface. Conventionally, there are two different types of optical coupling scheme between a PLC and surface illuminated type photodetectors or surface emitting type lasers. One is a parallel optical coupling scheme which maintains a light path parallel to a substrate and the other one is an edge optical coupling scheme which transforms a light path perpendicularly to a substrate.

The optical coupling scheme between photodetectors and a PLC, and between VCSELs and a PLC have the same basic principle except they have opposite in/out paths to each other. And thus, hereinafter, light coupling structures between a PLC and photodetectors will be described in detail.

In parallel optical coupling scheme between a DMUX AWG and surface illuminated type photodetectors, photodetectors are mounted perpendicularly in front of an end face of optical waveguides in order to receive lights from output waveguides of DMUX AWG. In general, the photodetectors and VCSELs have very thin thickness of about 0.1 mm to 0.2 mm, therefore it is difficult to mount the chip itself on a substrate. Therefore, photodetectors are usually attached on a third submount having an appropriate area and thickness and then the submount is vertically mounted in front of the optical waveguides end faces.

Those parallel optical coupling scheme between optical waveguides and active optical elements has several disadvantages: has a large volume, the end faces of the optical waveguides have to be polished, produces a large electrical signal attenuation caused by a long electrical connection path between the photodetector and an electrical signal processing element, and a complexity of alignment process between the photodetector and the optical waveguide.

In a vertical or edge optical coupling scheme, the light propagation path of output light from optical waveguide of a PLC is changed vertically upwards or downwards of waveguide substrate and then photodetectors are directly attached on the surface of PLC. The above-described vertical optical coupling scheme can avoid the use of submount. In addition, automated or semi-automated surface mount assembly technique (SMT) using a high precision placement apparatus can be applied because the photodetectors can be directly attached on a PLC by die bonding or flip chip bonding process. Moreover, an electrical connection path between the photodetectors and signal processing devices can also be very short.

However, in order to implement the above described vertical optical coupling scheme, light path transforming apparatus which perpendicularly changes a light path with respect to a substrate is required inside the optical waveguide.

An optical coupling scheme between optical waveguides and photodetectors using the above-described light path transforming apparatus is disclosed in the U.S. Pat. No. 4,904,036 filed by AT&T Co. and Bell Laboratories. As a recent example, it is suggested in a paper titled "Photonic integrated circuits based on silica and polymer PLC" written by T. Izuhara, et al. and published in SPIE proceeding Vol. 8628 862807-1 (2013).

FIG. 1 is a view illustrating a cross-sectional surface of an optical integrated circuit as prior art in which a light path turning mirror is embedded inside an optical waveguide and a photodetector is attached on the upper side of the light path turning mirror in order to describe a principle of vertical optical coupling scheme.

Referring to FIG. 1, an optical integrated circuit is provided with an optical waveguide consisted of a lower cladding layer 21, a core layer 22, and an upper cladding layer 23, and a groove 30 formed crossing the optical waveguide perpendicularly on a substrate 10.

Wherein, a sidewall 31 of the groove 30 crossing the optical waveguide through which light enters or exits is substantially perpendicular to a substrate, and an another sidewall 32 at the opposite side of the sidewall 31 is inclined about 45° with respect to the substrate 10 and is mirror-like polished for good light reflection.

In the above-described optical integrated circuit, light propagated through the core layer 22 substantially parallel to the substrate 10 exits to air from the sidewall 31 of the groove 30. The light which exited the optical waveguide and propagated through the air, is reflected by an inclined mirror surface 32, and turns its path upwardly and incidents into an active region of a photodetector 50 bonded by metal bonding pads 40 and solder bumps above the mirror surface 32, as shown by a reference numeral 35.

Wherein, when a light emitting VCSEL is applied instead of the photodetector 50, the direction of the light path 35 is opposite thereto.

By the way, in the above-described structure, when the optical waveguide is made of polymer as disclosed in the U.S. Pat. No. 7,995,875 or made of silicon as disclosed in the US Patent Publication No. 2014/0205234, the above-described mirror surface 32 can be fabricated relatively easily inside the optical waveguide. However, when the optical waveguide material is silica, it is very difficult to fabricate the above-described mirror surface 32 inside the optical waveguide because silica is known as a material very difficult to machine using dry etching techniques.

Conventionally, an anisotropic dry etching technique generally used for the manufacturing of optical waveguide is also used for the fabrication of light path turning mirror. In general, anisotropic etching forms grooves having a vertical sidewall. In contrast to the conventional grooves that could be formed by normal anisotropic dry etching techniques, a groove for vertical coupling requires that the sidewall 31 through which light enters or exits to or from the waveguide has to substantially perpendicular to the substrate 10 and the mirror surface 32 facing the vertical sidewall 31 has to have about 45° slope with respect to the substrate 10. Such a particular features of the groove (30) used for the exemplified applications (U.S. Pat. No. 7,995,875 and 2014/0205234) make difficult to implement such grooves by using the conventional anisotropic dry etching techniques and even more with a single processing step. In more detail, etching a groove having two different sidewall slopes as described above is very difficult. In despite of such difficulty, several methods of manufacturing the above-described light path turning mirror inside the optical waveguide have been disclosed. U.S. Pat. No. 8,236,481 disclosed by Google is one of the examples. However, most of the manufacturing methods proposed so far have several drawbacks; it requires very complex and high cost manufacturing processes such as electron-beam lithography, and in addition to that, the quality of the mirror surface and reproducibility of the slope angle are unsatisfactory.

SUMMARY OF THE INVENTION

It is therefore an object of the present invention to provide a PLC based optical integrated circuit and a method of manufacturing the same by providing a groove trench which is capable of accommodating a micro-mirror inside an optical waveguide to perform a light coupling between the optical waveguide and an optical element which emits or receives light to or from the optical waveguide and inserting and fixing the micro-mirror separately manufactured from the PLC manufacturing process into the groove.

It is further an object of the present invention to provide an optical integrated circuit which reduces an optical power loss due to defects on a mirror surface by separately manufacturing the micro-mirror from optical integrated circuit manufacturing process and thereby providing a higher quality mirror surface, and a method of manufacturing the same.

In addition, the present invention is also related to an optical integrated circuit having a lower manufacturing cost by providing a light path turning micro-mirror made of various materials such as silicon, glass, and plastics, and a method of manufacturing the same.

According to an aspect of the present invention, there is provided an optical integrated circuit comprising an optical waveguide formed by sequentially stacking a lower cladding layer, a core layer, and an upper cladding layer configured to surround the core layer on a substrate; a groove trench (hereinafter, groove) formed by etching the upper cladding layer, the core layer and all or part of the lower cladding layer close to an end-face of the optical waveguide to intercept the light propagating through the core layer of the optical waveguide or conversely to incident light into the core layer; a plurality of bonding pads, separated apart from each other disposed on the periphery of the groove; a micro-mirror placed and cemented in the groove, and having a slanted mirror surface inclined in a range from 30 to 60° with respect to the bottom surface of the mirror to vertically reflect incident light from the core layer to the light receiving element residing on the groove or vice versa to vertically reflect incident light from a light source positioned on the upper portion of the groove into the core layer; and an active optical element bonded by the metallic bonding pads emits or receives light toward the micro-mirror or from the micro-mirror.

A first sidewall of the groove which faces the slanted surface of the micro-mirror may be formed to be tilted at an angle in the range of 6° to 15° with respect to a longitudinal axis of the core layer to prevent re-entry of reflected light at the waveguide-air interface.

The optical integrated circuit may further include a recess formed by etching a part of the upper cladding layer excluding an area in which the bonding pads are to be formed prior to the groove formation, and the groove is formed inside the recess.

According to another aspect of the present invention, there is provided a method of manufacturing an optical integrated circuit comprising steps of: 1) a substrate is provided, 2) forming optical waveguides by sequentially stacking a lower cladding layer, a core layer, and an upper cladding layer on a surface of the substrate; 3) forming grooves by etching the upper cladding layer, the core layer, and all or part of the lower cladding layer of the optical waveguides, and; 4) cementing a micro-mirror having a slanted mirror surface which reflects light horizontally exited from the core layer perpendicularly toward the upper side of the groove, or conversely which reflects light emitted from the upper side of the groove toward the surface of the groove and turns the light path horizontally to the substrate to couple into the core layer; and 5) bonding active optical elements, which detects light reflected from the mirror surface or otherwise emits light toward the mirror surface from the upper side of the groove, to the bonding pads formed on the upper cladding layer surface.

BRIEF DESCRIPTION OF THE SEVERAL VIEWS OF THE DRAWINGS

The above and other objects, features and advantages of the present invention will become more apparent to those of ordinary skill in the art by describing in detail exemplary embodiments thereof with reference to the accompanying drawings, in which.

DESCRIPTION OF SPECIFIC EMBODIMENTS OF THE INVENTION

Hereinafter, an optical integrated circuit and a method of manufacturing the same according to exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
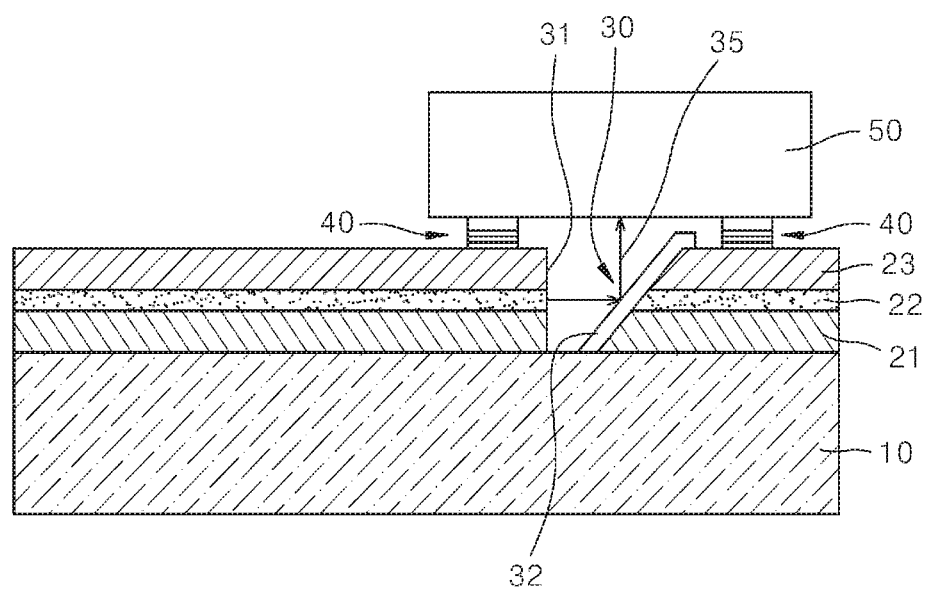
FIG. 1 is a cross-sectional view for describing an optical integrated circuit as prior art in which a conventional light path turning mirror is integrated.
Figure 2:
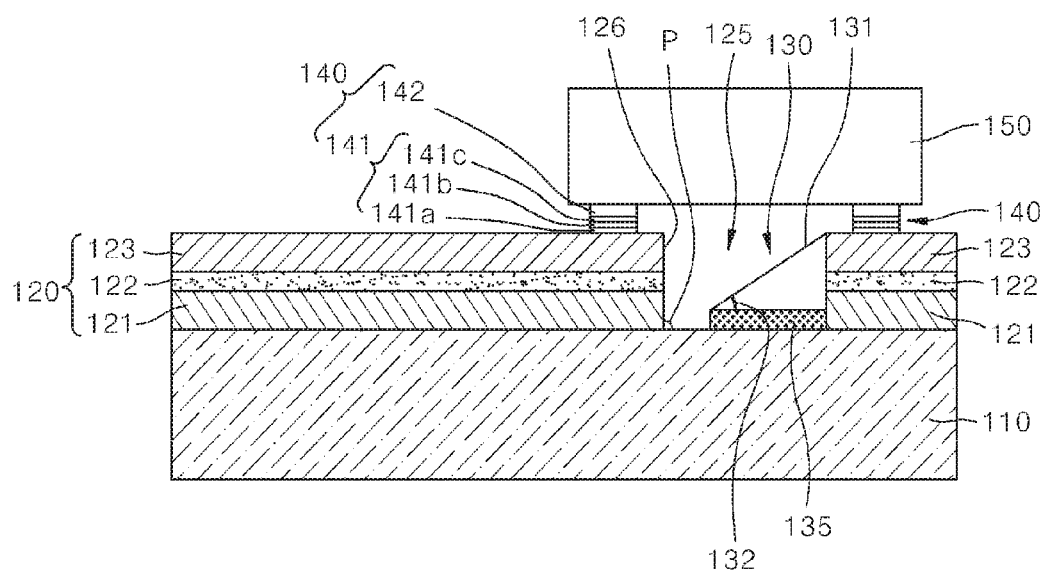
FIG. 2 is a cross-sectional view illustrating an optical integrated circuit according to a first embodiment of the present invention.
Figure 3:
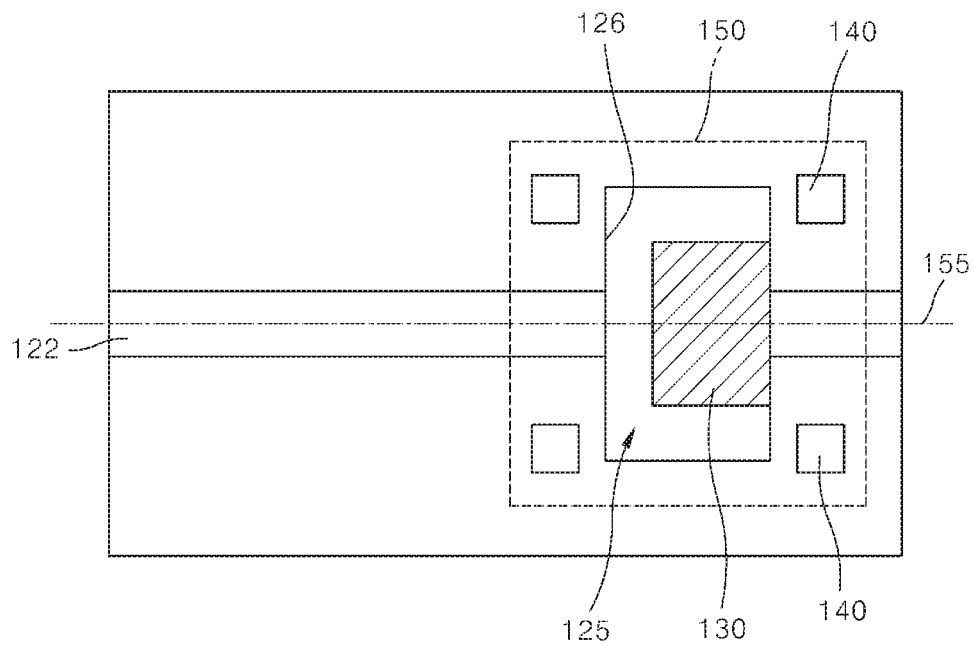
FIG. 3 is a plan view illustrating the optical integrated circuit shown in FIG. 2.

FIG. 2 is a cross-sectional view illustrating an optical integrated circuit according to a first embodiment of the present invention, and FIG. 3 is a plan view illustrating the optical integrated circuit shown in FIG. 2. For reference, an active optical element is indicated with a dotted line in FIG. 3.

Referring to FIGS. 2 and 3, an optical integrated circuit 100 according to the present invention comprises a substrate 110, an optical waveguide 120, a groove 125, a micro-mirror 130, bonding pads 140, and an active optical element 150.

The optical waveguide 120 is formed by sequentially stacking a lower cladding layer 121, a core layer 122, and an upper cladding layer 123 on the substrate 110.

The substrate 110 is made of silicon, silica glass, glass, or quartz.

The optical waveguide 120 guiding light through the core layer 122 is formed by polymer or silica glass, and composed of a lower cladding layer 121 coated on an entire surface of the substrate 110, a core layer 122 formed on the predetermined region of the lower cladding layer 121 along the longitudinal direction of the substrate, and an upper cladding layer 123 covering the core layer 122.

The lower cladding layer 121, the core layer 122 and the upper cladding layer 123 are formed of silica glass, and the core layer 122 further comprise a dopant to adjust a refractive index.

The optical waveguide 120 disposed at the left side of the groove 125 or at the input terminal of the groove 125 may be extended along the surface parallel to the substrate 110 with a straight or curved shape.

In addition, a single optical waveguide 120 is exemplified at the input terminal of the groove 125 in the illustrated drawing; however the optical waveguide 120 may have branches along the substrate 110.

For example, the optical waveguide 120 may have a single input terminal and a plurality of output terminals, that is a single input core layer is branched into two or more than two output core layers at an intermediate position between the input and output terminals.

Alternatively, the optical waveguide 120 may have a plurality of input terminals and a single output terminal, that is the plural number of input core layers are merged into one core layer at an intermediate position between the input and output terminals.

Alternatively, the optical waveguide 120 may be formed to have a plurality of input terminals and a plurality of output terminals.

The groove 125 is formed to cut the core layer 122 at a position close to an end section of the optical waveguide 120.

The groove 125 is formed by etching the upper cladding layer 123, the core layer 122 and all or part of the lower cladding layer 121 to intercept the light transmitted through the core layer 122, or conversely, to couple a light into the core layer 122.

The optical waveguide 120 truncated by the groove 125, may emit light into the groove 125 or, conversely, the optical waveguide 120 may receive light from the groove 125.

The groove 125 has no limitation to its shape as long as the groove 125 does not intrude the bonding pads 140 which will be described below.

A first sidewall 126 of the groove 125 through which light exits or enters to the truncated core layer 122 is formed substantially perpendicular the substrate.

In addition, the first sidewall 126 of the groove 125 which faces an inclined surface 131 of the micro-mirror 130, which will be described below, and through which the light exits or enters the truncated core layer 122 is formed to be substantially perpendicular to the substrate 110, and more preferably, is formed to have an angle "p" in a range of 80° to 110°.

It is preferable that other sidewalls as well as the first sidewall 126 forming the groove 125 are also substantially perpendicular to the substrate.

A bottom surface of the groove 125 is formed to be substantially flat, and to contact the lower cladding layer 121 of the optical waveguide 120, or more preferably, to contact the surface of the substrate 110.

The groove 125 is formed by patterning process using photolithography and anisotropic dry etching which are widely known in the art.

Figure 5:
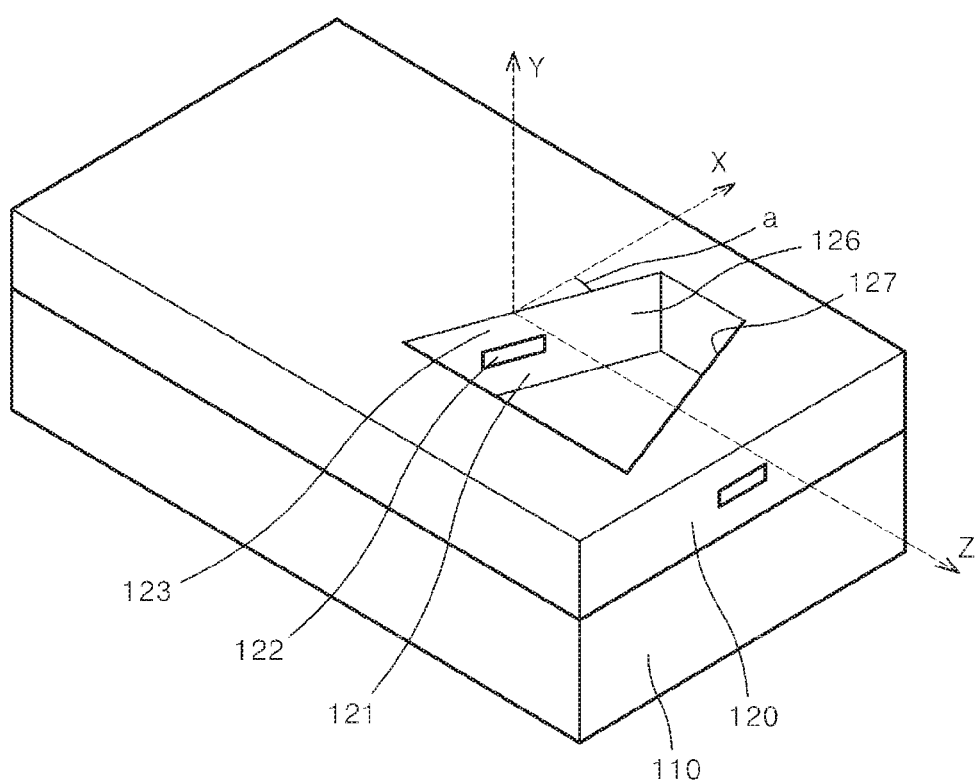
FIG. 5 is a perspective view illustrating an optical waveguide structure for describing an optical integrated circuit according to a third embodiment of the present invention.
Figure 6:
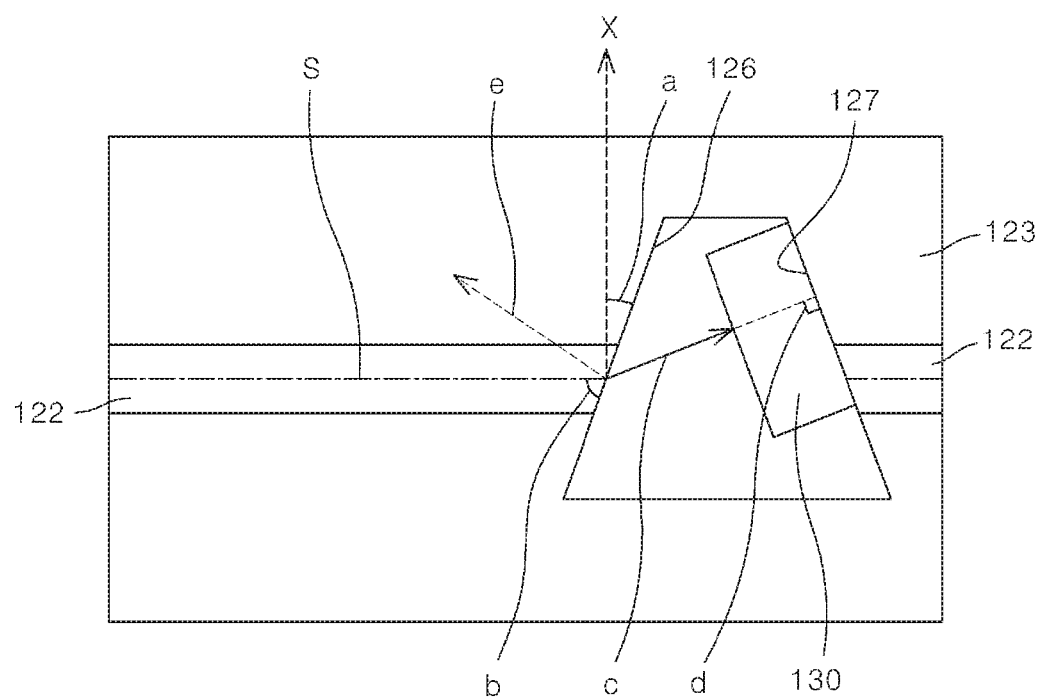
FIG. 6 is a plan view illustrating a structure in which a micro-mirror is mounted in the groove shown in FIG. 5.

As illustrated in FIG. 3, a horizontal cross-section of the groove 125 is a polygonal shape. That is, a horizontal cross-section of the groove 125 may be a quadrilateral shape, or a trapezoidal shape or the like as illustrated in FIGS. 5 and 6.

The micro-mirror 130 is inserted into the groove 125 and cemented thereto. The micro-mirror 130 reflects a light which exits the core layer 122 into the groove 125 and turns its path vertically over the groove 125, or conversely, reflects a light emitted downward from the upper side of the groove 125 and turns its path horizontally to couple the light into the core layer 122.

That is, when the active optical element 150 disposed on the micro-mirror 130 is a VCSEL, the light emitted downward from the VCSEL is reflected by the micro-mirror 130 and the light path is turned in a direction substantially parallel to the substrate 110, and the light is coupled into the core layer 122 of the optical waveguide 120.

In addition, when a photodetector is used as the active optical element 150 disposed on the micro-mirror 130, a light exits the core layer 122 into the groove 125 is reflected vertically by the micro-mirror 130 and enters into the active optical element 150.

The micro-mirror 130 is cemented inside the groove 125 by using a thermal curing adhesive 135.

The micro-mirror 130 may be also cemented by using a solder or metal alloys which have a melting point of at least above 300° C., instead of the adhesive 135.

Wherein, the micro-mirror 130 is independent element manufactured separately from the optical waveguide and has at least one slanted side surface 131.

An angle 132 of the slanted surface 131 of the micro-mirror 130 is in a range from 30° to 60° with respect to the bottom surface of the micro-mirror 130.

Preferably, the inclination angle 132 of the slanted surface 131 of the micro-mirror 130 is 45° with respect to the bottom surface of the micro-mirror 130.

It is preferable that the slanted surface 131 is coated with a metal to improve the reflection efficiency.

The micro-mirror 130 turns a light path which exits from the core layer 122 substantially parallel to the substrate 110, to an upward direction which is substantially perpendicular to the substrate 110.

The micro-mirror 130 has a height which does not interfere with the active optical element 150 disposed there above.

The micro-mirror 130 may be made of silicon, glass, polymer, etc.

When the micro-mirror 130 is made of a polymer, the micro-mirror 130 may be mass-produced at low cost by using a plastic molding technique.

When the micro-mirror 130 is made of <100> crystalline silicon, it is preferable that the inclined surface 131 be a (110) plane of the <100> crystalline silicon.

Figure 4:
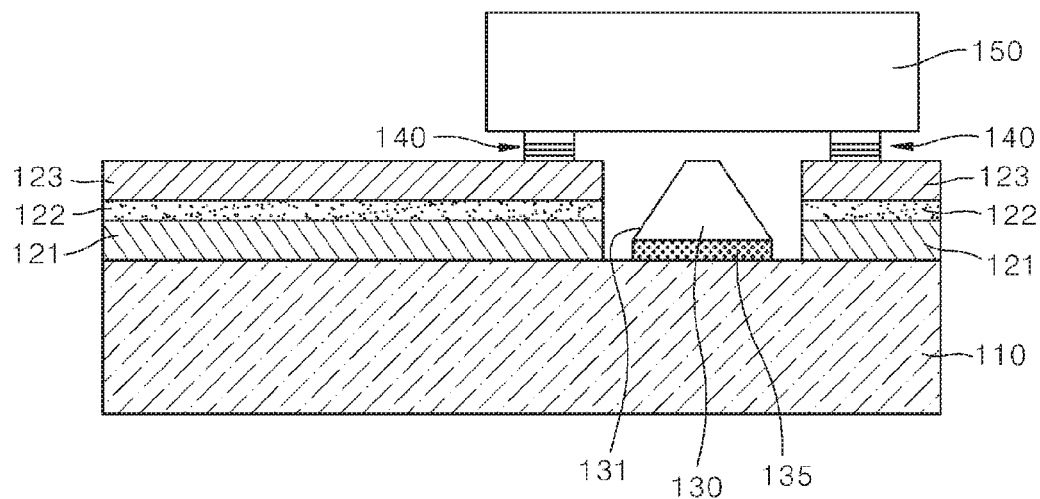
FIG. 4 is a cross-sectional view illustrating an optical integrated circuit according to a second embodiment of the present invention.

As illustrated, the micro-mirror 130 may have a single slanted surface 131, or as illustrated in FIG. 4 may have both side slanted surfaces.

The bonding pads 140 are formed on the surface of the optical waveguide that is, on the surface of upper cladding layer 123 along the groove 125 periphery as a plural number spaced apart from each other and composed of at least one metal layer 141 and a solder layer 142.

The metal layers 141 have the same structure with a conventional under-bump metallization (UBM) used for flip-chip bonding or solder bonding and comprise: an adhesion layer 141a consisted of Ti or Cr as a lowest layer; a diffusion barrier layer 141b consisted of Ni, Pt, or TiW on the adhesion layer 141a; and a passivation layer 141c consisted of gold on the diffusion barrier layer 141b.

The metal layers 141 may also be formed to have a different structure from the illustrated example.

The solder layer 142 is formed on top of the metal layer 141, and is a part in which the active optical element 150 is directly bonded thereon.

The active optical element 150 comprises bonding pads corresponding to the bonding pads 140 on the substrate 110, and the active optical element 150 is bonded to the bonding pads 140 using a flip-chip bonding or a die bonding method. When a solder layer is provided on the bonding pads of the active optical element 150, the solder layer 142 may be omitted.

A surface receiving type photodetector or a VCSEL may be used for the active optical element 150.

An optical filter which transmits light having specific wavelength or wavelength band may be inserted at the front surface of the active optical element 150.

Meanwhile, an inside of the groove 125 in which the micro-mirror 130 is mounted may be filled with a transparent polymer.

Here, the polymer filling the groove 125 may prevents micro-mirrors from environmental contamination and it is preferable to have the same or a similar refractive index as that of the core layer 122.

Such an optical integrated circuit may also be formed to have a structure which comprises a plurality of optical waveguides, grooves formed close to the end sections of the optical waveguides, micro-mirrors embedded in the individual grooves, and active optical elements bonded above the individual micro-mirrors.

Alternatively, an optical integrated circuit may also be formed to have a structure comprises a plurality of optical waveguides, a single groove which crosses the plurality of optical waveguides, a single micro-mirror inserted in the groove, and a single array type active optical element bonded over the single micro-mirror.

In addition, an optical integrated circuit may be an optical demultiplexer, an optical multiplexer, or a coherent receiver.

Meanwhile, about 4% back-reflection occurs at the waveguide-air interface due to a refractive index difference between the silica and the air (about 1.46:1) when light exits from silica to air. Normally in order to prevent this adverse effect, an anti-reflection layer is coated on the end face of the optical waveguide. The optical anti-reflection layer is consisted of at least one thin film layer, and generally formed by using sputtering or evaporation method. In this process, it is important to precisely control the thickness of each layer.

By the way, it is very difficult to form uniform anti-reflection layers on the substantially perpendicular end face of the first sidewall 126 of the groove 125 by sputtering or evaporation method. As described above, when there is no anti-reflection layer on the end face of the optical waveguide, about 4% light reflection occurs at the waveguide-air interface, it is redirected into the waveguide, and then it can interfere with an input light signal.

An alternative way to solve such a back reflection problem due to the refractive index difference is tilting the end face of the optical waveguide with respect to a longitudinal axis of the optical waveguide so that the reflected light enters the core layer with an angle greater than a critical angle necessary for total internal reflection.

In the theory of optical waveguide, a critical angle needed for total internal reflection is determined by the refractive index of a core layer and a cladding layer and it can be easily conceived by those skilled in the art, therefore, detailed descriptions thereof will be omitted.

Generally, an end-face of the optical waveguide not considering the back reflection is perpendicular to both the substrate and a longitudinal axis of the optical waveguide or a propagation direction of light.

Therefore, there may be two different methods of tilting or rotating the end-face of the optical waveguide.

That is, 1) tilting the end-face of the optical waveguide at an angle less or greater than 90° with respect to a surface normal to the substrate 110, and 2) rotating an end-face of the optical waveguide at an angle less or greater than 90° with respect to an axis normal to the longitudinal axis of the optical waveguide but keeps normal to the substrate 110.

With reference to FIGS. 5 and 6, those two methods will be described in detail. Elements which perform the same functions as illustrated in the previous drawings will be marked by the same reference numerals. When a direction parallel to a longitudinal axis S of an optical waveguide 120 is referred to as a Z direction, a cross-section of the optical waveguide 120 can be denoted using a X axis parallel to a substrate 110 and a Y axis perpendicular to the substrate 110. There are two methods rotating the first sidewall 126 of the groove 125; that is, rotating around the X axis of the optical waveguide 120 and rotating around the Y axis of the optical waveguide 120.

An etched cross-section of an optical waveguide 120 is substantially perpendicular to the substrate 110 as described in the related art due to a characteristic of anisotropic dry etching used for a groove 125 formation. So that it is much easier to manufacture a cross-section of a waveguide rotated around the Y axis of the optical waveguide 120 which is perpendicular to the substrate 110 between the two methods.

Accordingly, a groove 125 having a first sidewall 126 which is rotated a predetermined angle around the Y axis of the optical waveguide 120 is formed by dry etching the optical waveguide 120.

Here, when a refractive index difference between the core layer 122 and two cladding layers 121, 123 is about 3%, an appropriate rotation angle "a" of the first sidewall 126 around the Y axis or tilt angle "a" between the first sidewall 126 and the X axis is in a range of 6° to 15°. In another way referring to FIG. 6, the angle "a" may be expressed by an acute angle "b" between the longitudinal axis S of the optical waveguide 120 and the first sidewall 126. In this case, the acute angle "b" is preferably in a range of 75° to 84°.

In the above description, the same effect may be obtained when the direction of the rotation of the first sidewall 126 around the Y axis as illustrated in FIG. 5 is reversed and, therefore the acute angle "a" may be in a range of ±6° to ±15°.

When the first sidewall 126 is formed to have such an angle with respect to the Y axis of the optical waveguide 120, a back reflected light at the first sidewall 126—air interface re-enters into the core layer 122 with an incident angle greater than a critical angle needed for total internal reflection of the optical waveguide 120, and then the back reflected light cannot propagate inside the core layer 122 and finally escapes to the cladding layer 123.

That is, back reflected light "e" indicated with a dotted line in FIG. 6 is restrained from transmission in the core layer 122, and transmitted light "C" marked as a solid line propagates toward the micro-mirror 130.

Meanwhile, during the cementing process of the micro-mirror 130 inside the groove 125, a second sidewall 127 of the groove 125 facing the first sidewall 126 may be used for guiding a position and an angle of the micro-mirror 130.

Referring to FIG. 6, the second sidewall 127 of the groove 125 facing the first sidewall 126 is formed normal to a central line "c" of the diffracted light at the first sidewall 126 and air interface. That is, an angle "d" between the central line "c" of the diffracted light and the second sidewall 127 is formed to be 90°. In this way, the micro-mirror 130 is automatically arranged so that the slanted surface 131 perpendicularly reflects the light which exited the core layer 122 by closely adhering and fixing the micro-mirror 130 to the second sidewall 127.

Figure 7:
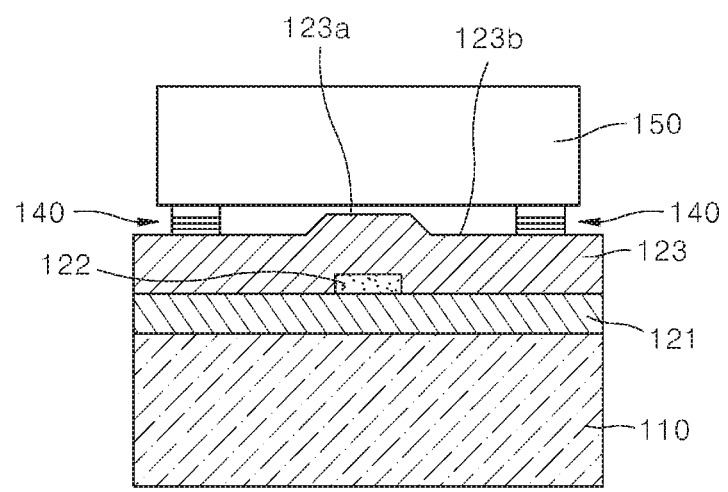
FIG. 7 is a cross-sectional view illustrating a conventional optical integrated circuit in which a top of core layer is higher than the surroundings.

Meanwhile, as illustrated in FIG. 7, an actual optical waveguide 120 may have a structure in which a central portion 123a wherein a core layer 122 is formed below is slightly higher than a peripheral portion 123b. In more detail, during the process of forming a core layer 122 having a thickness of 4 μm to 6 μm on a lower cladding layer 121, an unnecessary deposited core layer except an area constituting the core 122 is removed, and then an upper cladding layer 123 is formed thereon. Therefore the central portion 123a where the core layer 122 is formed below may become relatively higher than the periphery as much as the thickness of the core layer 122.

In such a structure, in order to prevent an interference between an active optical element 150 and the upper cladding layer 123 above the core layer 122, the bonding pads 140 formed on the peripheral portion 123b of the core layer 122 have to be formed higher than the central portion 123a of the upper cladding layer 123 over the core layer 122. Increasing the height of the bonding pads 140 becomes a factor which not only makes a manufacturing process difficult but also raises manufacturing costs.

Figure 8:
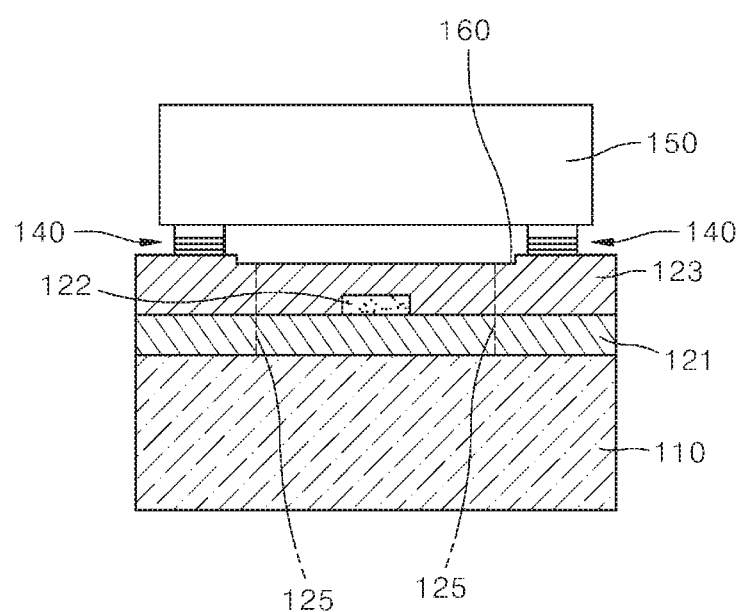
FIG. 8 is a cross-sectional view illustrating an optical integrated circuit according to a fourth embodiment of the present invention.
Figure 9:
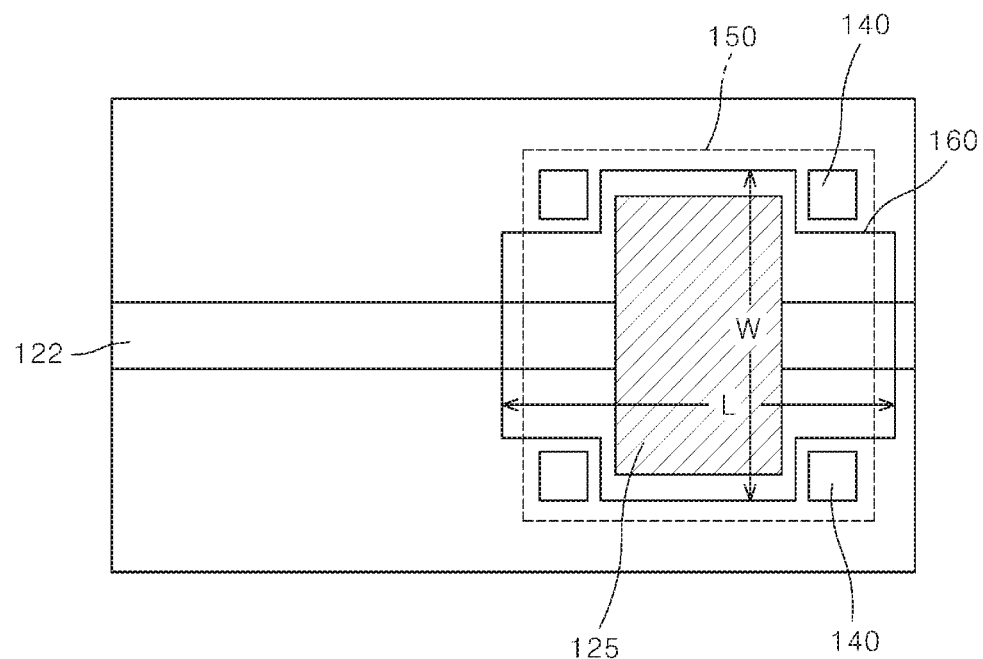
FIG. 9 is a plan view illustrating the optical integrated circuit shown in FIG. 8.

A structure to overcome such a problem is illustrated in FIGS. 8 and 9.

Referring to FIGS. 8 and 9, prior to form a groove 125, forms a recess 160 by etching a part of an upper cladding layer 123 which faces an active optical element 150 to a depth equal to or greater than height deference between a central portion 123a and a peripheral portion 123b of the upper cladding layer 123. Wherein, an effect of decreasing the height of the bonding pads 140 can be obtained by excluding a region in which bonding pads 140 are to be formed from the recess 160 area.

Wherein, a length L of the recess 160 is greater than the width of an active optical element 150. And a width W of the recess is greater than a width of the central portion 123a of the upper cladding layer 123 and less than the width of the active optical element 150, or the width W of the recess can be greater than the width of the active optical element 150.

The groove 125 is formed in the recess 160 using the same method described above.

Hereinafter, a manufacturing process of an optical integrated circuit will be described.

First, an optical waveguide 120 comprising a lower cladding layer 121, a core layer 122, and an upper cladding layer 123 on a surface of a substrate 110 is formed. Next, a recess 160 is formed by etching a part of the upper cladding layer 123 to a depth equal to or greater than the step height. Wherein, a region on which the bonding pads 140 is to be formed later is excluded from the recess area in which the active optical element 150 is to be disposed later in the recess area.

Here, by increasing a length L of the recess 160 greater than a width of the active optical element 150 in a direction parallel to the core layer 122 of the optical waveguide 120, the active optical element 150 is prevented from directly touching the upper cladding layer 123 of the optical waveguide 120. In addition, a width W of the recess 160 in a direction perpendicular to the core layer 122 of the optical waveguide 120 is greater than a width of the area where step height is exist, however, it is also plausible that the width W is less than a width of the optical element or greater than a width of the optical element.

Next, the groove 125 is formed by sequentially etching the upper cladding layer 123, the core layer 122, and all or part of the lower cladding layer 121 inside the recess 160 region.

Next, the bonding pads 140 are formed, and a micro-mirror 130 prepared separately is inserted into the groove 125 and cemented thereto.

Finally, an active optical element 150 is bonded by the bonding pads 140 on the upper cladding layer 123 over the groove 125.

In the present invention as described above, a light path turning micro-mirror 130 is manufactured independently of a PLC manufacturing process and inserted into the vertically truncated optical waveguide 120. Thus in this invention, the light path turning micro-mirror 130 can be made of various kind of materials and also the manufacturing cost of the optical integrated circuit 100 can be reduced.

In addition, the truncation angle of the optical waveguide can be properly adjusted and the cross-section of truncated optical waveguide can be rotated with respect to a light axis of the optical waveguide such that a back reflected light at the air-waveguide interface can be prevented from being transmitted through the optical waveguide.

Particularly, in the conventional art an optical waveguide itself is etched and the etched slanted side surface is used as a light path turning mirror to perform vertical light coupling between a planar optical waveguide and a surface illuminated type photodetector. Thus the manufacturing process of the mirror is very complex, requires very expensive processing equipment, the quality of the mirror surface is poor, and also there are many difficulties in controlling the angle of the mirror surface. However, in the present invention, the mirror is manufactured independently of a PLC manufacturing process so that the mirror can be more easily manufactured with various kinds of materials.

As described above, an optical integrated circuit and a method of manufacturing the same provides advantages; a PLC comprises simple groove trenches having vertical sidewall which are easily fabricated by conventional dry etching process, micro-mirrors are provided independently of the PLC fabrication process and the micro-mirrors are mounted into the grooves, and thus an optical integrated circuit manufacturing process is easier, a high-quality mirror surface can be provided, an optical loss by defective mirror surface can be reduced, micro-mirrors can be provided by various material, and thus, manufacturing costs can be reduced.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:
1. An optical integrated circuit comprising:
   a substrate;
   an optical waveguide formed by sequentially stacking a lower cladding layer, a core layer, and an upper cladding layer on the substrate;
   a groove formed by etching the upper cladding layer, the core layer, and all or parts of the lower cladding layer disposed close to an end face of the optical waveguide to intercept light transmitted through the core of the optical waveguide or to couple light into the core of the optical waveguide;
   a plurality of bonding pads formed spaced apart from each other on the surface of the optical waveguide around the periphery of the groove;
   a micro-mirror having at least one slanted side surface inclined to a range of 30° to 60° with respect to the bottom surface and cemented on the bottom of the groove to reflect light exits horizontally from the core layer to the groove and turn the light path vertically toward upper side of the groove, or conversely, to reflect light emitted vertically from the upper side of the groove toward the surface of the groove and turn the light path horizontally to the core layer;
   an active optical element which is bonded by the bonding pads, and emits light toward the slanted side surface of the micro-mirror, or conversely, receives light reflected from the slanted side surface of the micro-mirror; and
   a recess formed by etching a part of the upper cladding layer before the groove is formed excluding an area in which the bonding pads are to be formed, wherein the groove is formed inside the recess area.

2. The optical integrated circuit of claim 1, wherein the substrate is provided by any one selected from silicon and silica glass.

3. The optical integrated circuit of claim 1, wherein the micro-mirror is cemented to a bottom surface of the groove using a thermal curing epoxy.

4. The optical integrated circuit of claim 1, wherein the micro-mirror is made of silicon wafer.

5. The optical integrated circuit of claim 4, wherein the slanted side surface of the micro-mirror has (110) crystal plane of <100> silicon wafer.

6. An optical integrated circuit comprising:
   a substrate;
   an optical waveguide formed by sequentially stacking a lower cladding layer, a core layer, and an upper cladding layer on a substrate;
   a groove formed by etching the upper cladding layer, the core layer, and all or parts of the lower cladding layer placed close to an end face of the optical waveguide to intercept light travelled through the core layer of the optical waveguide or to couple light into the core of the optical waveguide;
   a plurality of bonding pads spaced apart from each other on the surface of the optical waveguide around the periphery of the groove;
   a micro-mirror having at least one slanted mirror surface inclined in a range of 30° to 60° with respect to the bottom surface and cemented on the bottom of the groove to deflect horizontal light out of the core layer and/or light out of the plane of the waveguide into the core layer of the waveguide,
   a micro-mirror inserted and cemented in the groove, and having a slanted mirror surface tilted with respect to the bottom surface about 30° to 60° to turn the path of light exits horizontally from the core into the groove vertically to the substrate, or conversely, to turn the path of light vertically emitted from the upper side of the groove toward the substrate and couple the light into the core; and an active optical element which is bonded by metal bonding pads, and emits light toward the slanted mirror surface of the micro-mirror, or conversely, receives light reflected from the slanted mirror surface of the micro-mirror, wherein a first sidewall of the groove which faces the slanted side surface of the micro-mirror is substantially perpendicular to the substrate, and the sidewall is rotated at an angle in orange from 6° to 15° with respect to a normal cross-section of the longitudinal axis of the core layer.

7. The optical integrated circuit of claim 6, wherein the slanted angle of the mirror surface of the micro-mirror is 45° with respect to the bottom surface of the mirror.

8. The optical integrated circuit of claim 6, wherein the substrate is provided by any one selected from silicon and silica glass.

9. The optical integrated circuit of claim 6, wherein the micro-mirror is cemented on a bottom surface of the groove by a thermal curing epoxy.

10. The optical integrated circuit of claim 6, wherein the micro-mirror is provided by crystalline silicon wafer.

11. The optical integrated circuit of claim 10, wherein the slanted surface of the micro-mirror has (110) crystal plane of <100> silicon wafer.

12. The optical integrated circuit of claim 6, wherein the micro-mirror is made of a polymer.

13. The optical integrated circuit of claim 6, further comprising a recess formed by etching a part of the upper cladding layer before the groove is formed excluding an area in which the bonding pads are to be formed, wherein the groove is formed in the recess area.

14. The optical integrated circuit of claim 6, wherein a second sidewall of the groove which faces the first sidewall is formed perpendicular with respect to the propagation direction of diffracted light at the first sidewall-air interface.

15. A method of manufacturing an optical integrated circuit comprising a step of:
forming optical waveguides by sequentially stacking a lower cladding layer, a core layer, and an upper cladding layer on a substrate;
forming grooves by etching the upper cladding layer, the core layer, and all or parts of the lower cladding layer of the optical waveguides to intercept light transmitted through the core layer of the optical waveguide or to couple light into the core layer of the optical waveguide;
cementing micro-mirrors having at least one slanted mirror surface inclined to a range of 30° to 60° with respect to the bottom surface of the micro-mirror to deflect a path of horizontal light out of the core layer, or conversely, a path of vertical light out of the plane of waveguide into the core layer of waveguide; and
bonding active optical elements on bonding pads, which emit light toward the slanted mirror surface of the micro-mirror, or conversely, receive reflected light from the slanted mirror surface of the micro-mirror,
wherein a first sidewall of the groove which faces slanted surface of the micro-mirror is substantially perpendicular to the substrate, and also is rotated in a range from 6° to 15° with respect to a normal cross-section of the longitudinal axis of the core layer.

16. The method of claim 15, wherein a second sidewall of the groove which faces the first sidewall is formed to be perpendicular to a central axis of light which is diffracted by the first sidewall-air interface and exits the core layer therethrough.

* * * * *